UNITED STATES PATENT OFFICE.

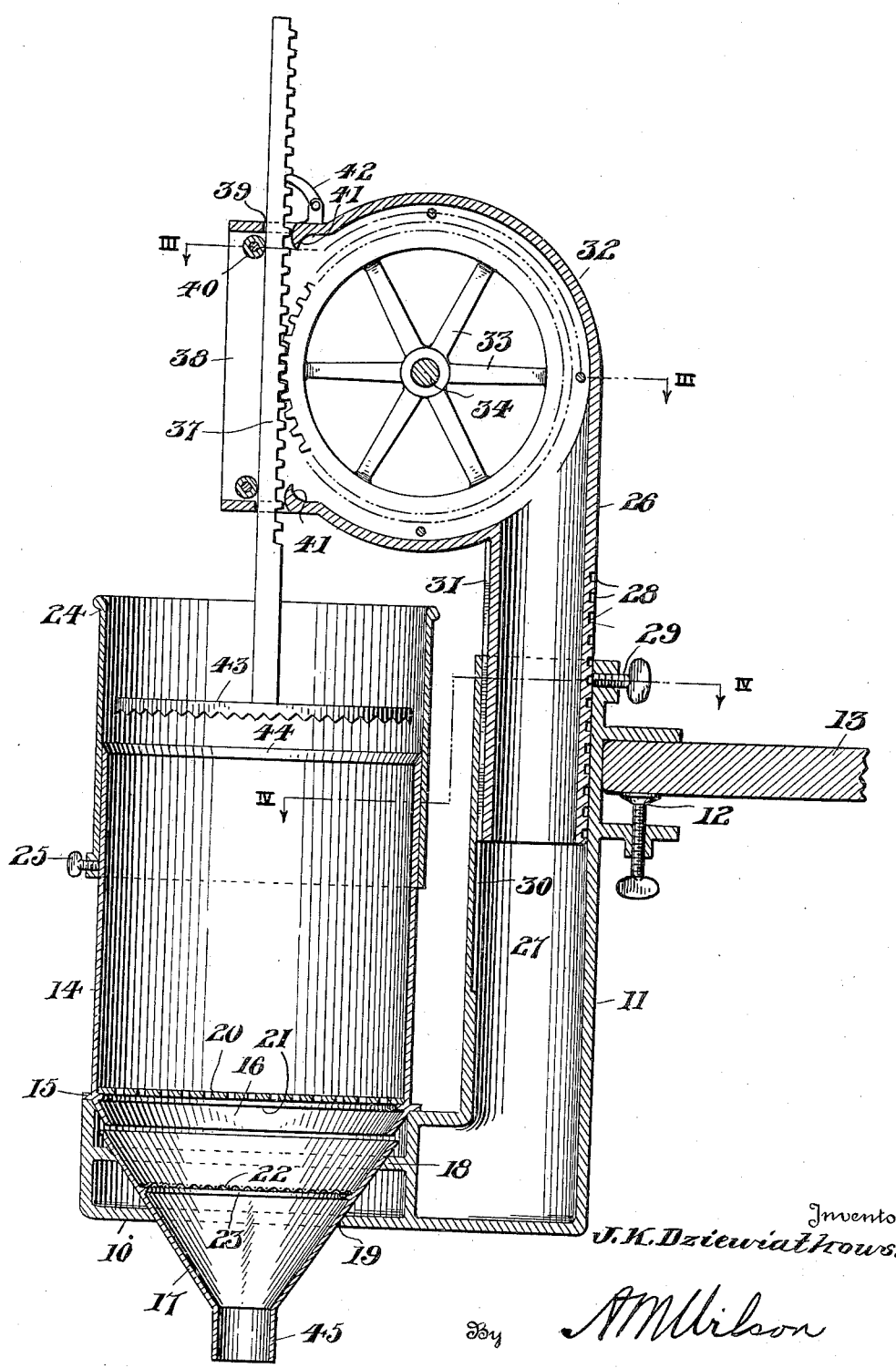

JAN KAZ. DZIEWIATKOWSKI, OF HAMTRAMCK, MICHIGAN.

FRUIT-PRESS.

1,232,251.   Specification of Letters Patent.   Patented July 3, 1917.

Application filed January 27, 1917. Serial No. 144,871.

*To all whom it may concern:*

Be it known that I, JAN KAZ. DZIEWIATKOWSKI, a subject of the Emperor of Germany, residing at Hamtramck, in the county of Wayne and State of Michigan, have invented certain new and useful Improvements in Fruit-Presses, of which the following is a specification.

This invention relates to new and useful improvements in a fruit press.

The primary object of the invention is the provision of a strong press adapted for household use being inexpensive to manufacture and capable of rapidly extracting juices from fruit and vegetables.

A further object of the device is the provision of a fruit and vegetable press which is adjustable in capacity and is formed of a plurality of separable parts whereby the same is readily kept in a cleanly condition, a strong operating means being arranged with the device.

In the drawing forming a part of this application and in which like-designating characters refer to corresponding parts throughout, there is illustrated a central vertical sectional view of a press constructed in accordance with the present invention and operatively attached to a support.

Referring to the drawing, it will be noted that the body of the device consists of a cylindrical base 10 having an upright 11 provided with a clamp 12 for mounting the press upon any convenient support, such as the table 13. An open ended container or can 14 has a projecting flange 15 at its lower end seated upon the top of the base 10, while a downwardly tapering apron 16 carried by the bottom of the can seats within the said base. A funnel 17 is removably supported within the base 10 in axial alinement with the apron 16, the same being mounted upon an inwardly projecting rib 18 substantially centrally arranged within the base and also contacting the sides of a central opening 19 in the bottom of the base through which the funnel projects.

It will be noted that the tapering of the apron 16 and the funnel 17 is substantially the same and that the diameter of the open top of the funnel is greater than that of the adjacently positioned open bottom of the apron 16 adapted for allowing matter to pass from the can 14 to the said funnel. A grating or grid 20 is removably mounted in the bottom of the can 14 upon an annular bead 21 thereof, while a strainer 22 is removably arranged within the funnel 17 upon an annular seat 23 arranged within the same.

An extension member 24 of tubular form is adapted to telescope around the can 14, being retained in its adjusted position by a set screw 25, whereby the capacity of the container adapted to receive the fruit and vegetables to be operated upon is altered as found desirable. A goose neck 26 is adjustably positioned within the bore 27 of the mounting member 11 and is fitted with sockets 28 in one side thereof adapted for engagement with a screw 29 when the said member 26 is in its adjusted positions, it being noted that a longitudinal interior groove 30 is provided in the tube 11 within which a longitudinal rib 31 of the neck 26 is guidingly arranged.

The goose neck 26 is provided with a cylindrical head 32 within which a gear 33 is journaled by means of a power shaft 34 having a turn crank upon its outer end, it being noted that a removable side plate is provided for the head 32 to permit the positioning of the gear 33.

A toothed rack 37 is vertically shiftably arranged through an open ended extension 38 of the head 32 centrally above the can 14, the said rack being arranged through alining openings 39 in the said extension and being in constant mesh with the gear 33, while anti-friction rollers 40 prevent the frictional engagement of the rack with the outer sides of the said alining openings. The metal at the inner sides of the openings 39 is inturned as at 41 in the form of lips adapted for preventing the teeth of the rack 37 from becoming engaged and caught within the opening. A hinged pawl 42 is carried by the head 32 for ratcheting engagement with the rack 37 whereby the rack is maintained in its adjusted position when elevated by means of the gear 33.

A press head 43, in the form of a disk, is arranged upon the lower end of the rack 37 and reciprocates within the can 14 and its extension 24 after the manner of a piston. The upper edge 44 of the can 14 is inwardly beveled, while it will be seen that the goose neck 26 may be adjusted as found necessary with respect to the relative adjustment of the sizes of the container when the extension 24 is elevated.

The operation of the device will be at once apparent from this detailed description thereof, it being understood that articles such as fruit are positioned within the can 14 upon the grating 20 and the crank 35 thus turned for lowering the pressing disk 33 against the fruit, pressing the fruit through the perforations of the grate, the juice passing downwardly into the funnel 17 being strained by the member 22 and thence passes outwardly through the bottom extension 45 of the funnel. Upon elevating the rack and pressing head, the can 14 may be readily removed from the base 10 while the grating is also removed and the funnel 17 can then be removed from the base so that all parts of the device which come in contact with the articles operated upon may be washed and cleaned. The gear and rack operating means for the pressing disk 43 makes it possible to exert great pressure upon the articles positioned within the can 14, and the device is serviceable in making wine, cider and other products from both fruit and vegetables.

What I claim as new is:

1. A press comprising a base, a can adjustable in size removably arranged upon the said base, a goose neck adjustably mounted adjacent the can and having a cylindrical head, a gear journaled within the said head, a rack carried by the head in operative engagement with the said gear and a pressing disk upon the said rack vertically reciprocable within the can.

2. A press comprising a tubular support having a base provided with an opening carried thereby, an inwardly extending annular rib carried by the base, a funnel mounted within the said base and supported by the said rib and the sides of the opening in the bottom of the base, an open ended can mounted upon the base having an inwardly tapered apron projecting within the base opening into the said funnel, a goose neck adjustably mounted upon the said support, a reciprocating plunger within the said can, an operating means for the said plunger carried by the said neck.

3. A press comprising a support a removable can adjustable in size carried thereby, a goose neck adjustably carried by the support having a cylindrical head provided with an extension having alining openings therethrough, a gear journaled within the said head, a toothed rack slidably arranged within the said openings mounted within the said gear, a disk upon the lower end of the rack within the said can, antifriction rollers carried by the head extension in engagement with the said rack, and a retaining pawl for the said rack carried by the head.

In testimony whereof I affix my signature.

JAN KAZ. DZIEWIATKOWSKI.

Copies of this patent may be obtained for five cents each, by addressing the "Commissioner of Patents, Washington, D. C."